I. N. & W. PENNOCK.
Combined Tire Upsetter and Shear.
No. 200,334. Patented Feb. 12, 1878.
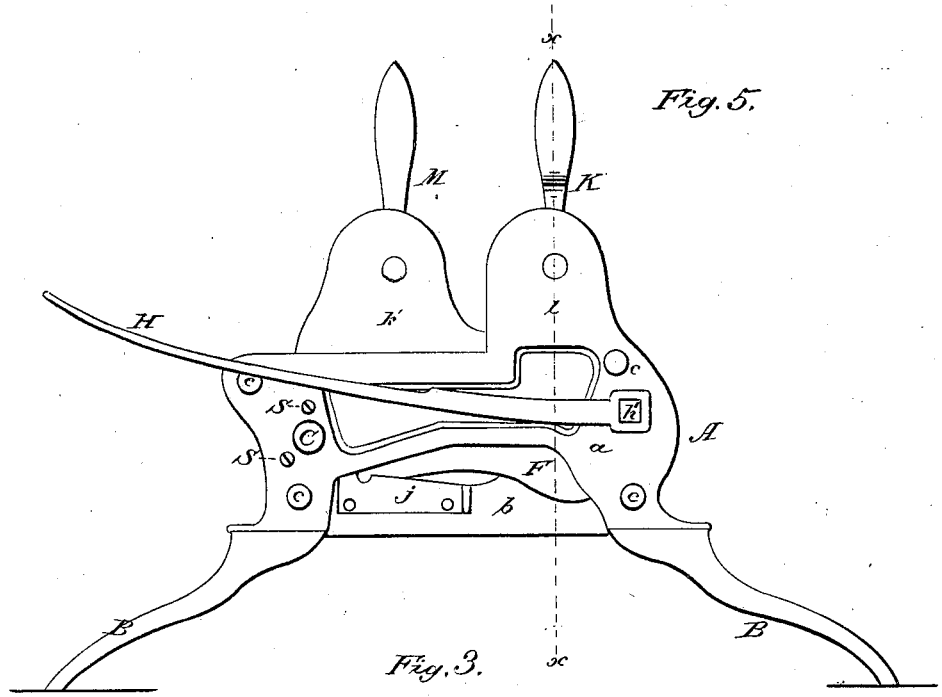
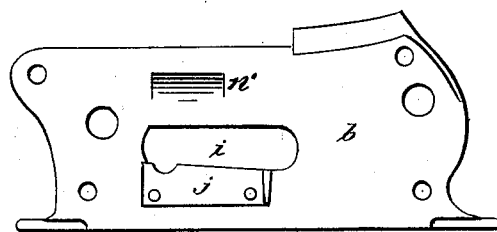
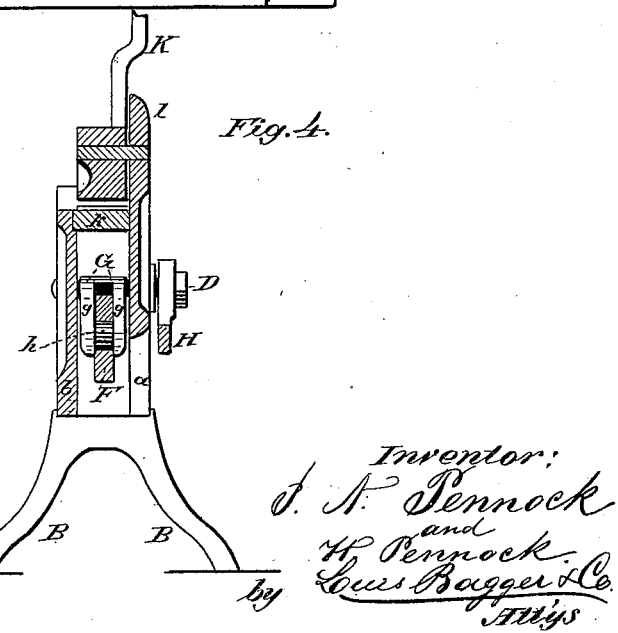

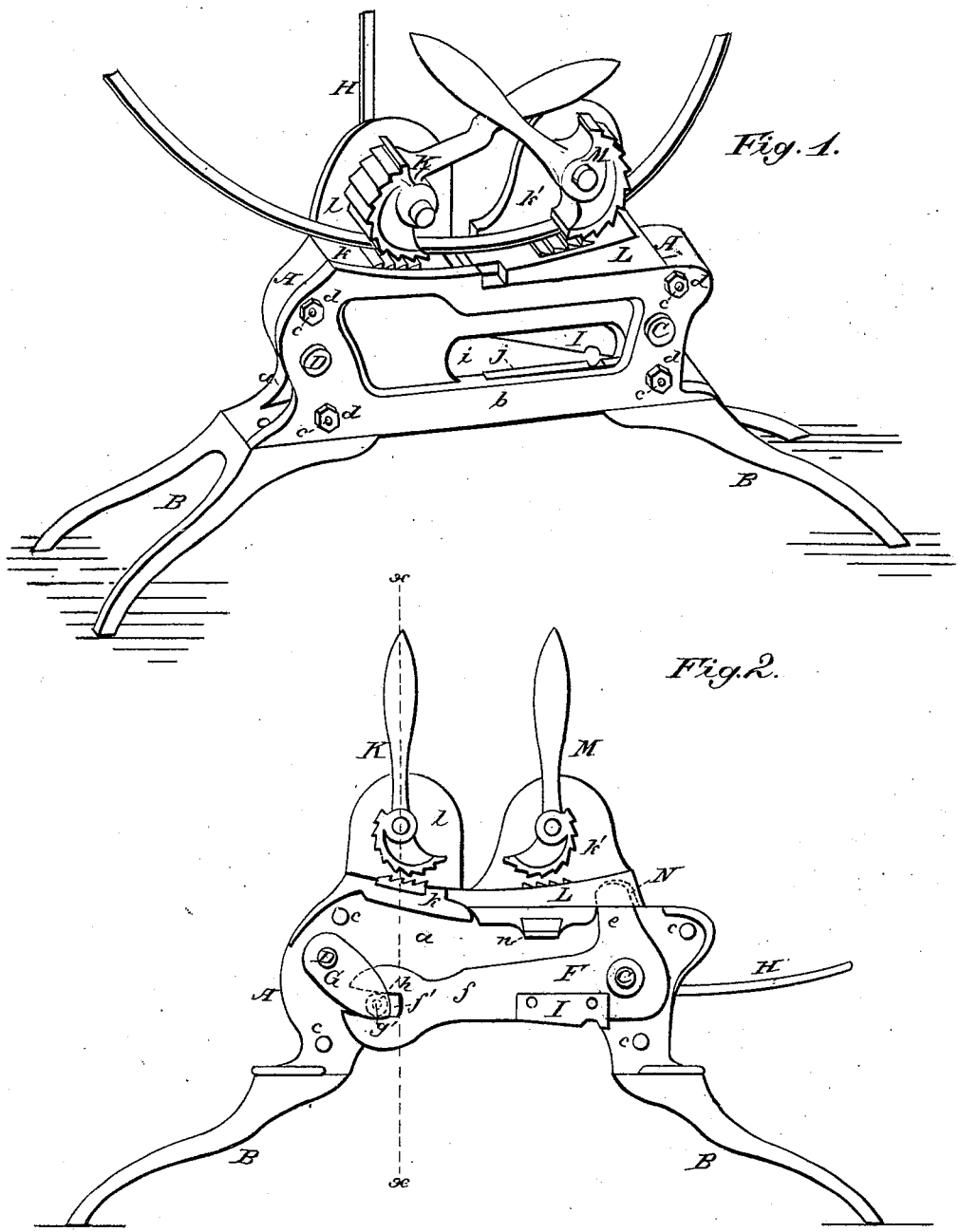

UNITED STATES PATENT OFFICE.

ISAAC N. PENNOCK AND WILLARD PENNOCK, OF MINERVA, OHIO.

IMPROVEMENT IN COMBINED TIRE UPSETTER AND SHEARS.

Specification forming part of Letters Patent No. 200,334, dated February 12, 1878; application filed July 7, 1877.

*To all whom it may concern:*

Be it known that we, ISAAC N. PENNOCK and WILLARD PENNOCK, both of Minerva, in the county of Stark and State of Ohio, have invented certain new and useful Improvements in Tire Upsetting and Shearing Machines; and we do hereby declare that the following is a full, clear, and exact description thereof, which will enable others skilled in the art to which it appertains to make and use the same, reference being had to the accompanying drawings, which form a part of this specification, and in which—

Figure 1 is a perspective view. Fig. 2 is a front elevation, the covering-plate having been removed. Fig. 3 is a plan view of the reverse side of the covering-plate. Fig. 4 is a cross-section after the line $x$ $x$ in Figs. 2 and 5, and Fig. 5 is a rear elevation.

Similar letters of reference indicate corresponding parts in all the figures.

This invention relates to certain improvements in machines for shearing and upsetting tires; and it consists in the construction and arrangement of parts, which we shall now proceed more fully to describe with reference to the drawings hereto annexed, in which—

A is the frame of the machine. This consists of two parts, $a$ $b$, united by bolts $c$. The front part $b$ forms a covering-plate, which may be detached by removing the nuts $d$. The whole frame is elevated upon two pairs of legs, B, bolted to the under side thereof.

C D are two shafts, having their bearings in the sides $a$ $b$ of the machine. Upon one of these shafts, C, is pivoted a bent lever, F, the long arm of which, $f$, is forked at the end, as shown at $f'$. Shaft D has a cam, G, formed by two parallel wings, $g$ $g$, between which is pivoted, upon a stout pin, $g'$, a friction-roller, $h$, which takes with the forked end of lever F, which may thus be operated. Shaft D projects upon the rear side of the machine, where it is squared off, as shown at $h'$, and is provided with a lever, H, by which it is operated.

The front of the bent lever F has a dove-tailed recess, in which is fitted the shear-blade I, secured in place by a key or screws. The front plate $b$ of the frame has a slot, $i$, below which the second shear-blade J is fitted in like manner. The shear-blade I being a tangent to the fulcrum C of the lever, a drawing-shear is formed, which enables metal to be cut with the expenditure of less power than otherwise.

On top of the frame A, at one end thereof, is an upwardly-projecting bracket, $l$, to which is pivoted an eccentric-lever, K, having a toothed or serrated surface, which faces the similarly toothed or serrated surface of the upper flange $k$. L is a plate, which slides upon the top of frame A, reaching from one of its sides, $a$, to the other, $b$, and is provided with an upright or bracket, $k'$, upon the side of which is pivoted an eccentric toothed lever, M, similar to K, its toothed surface facing the similarly-serrated surface of the body of the slide. Upon its under side the slide L has a stud or projection, $n$, which slides in grooves $n'$ in the sides $a$ $b$, thus preventing the slide from being displaced.

The short arm $e$ of the bent lever F passes from fulcrum C in an upward direction, and its end fits loosely in a recess, N, in slide L. Thus, when the lever F is operated by the mechanism hereinbefore described, the slide L will, at the same time, be slowly reciprocated, but with great force, the combined purchase of levers H and F being brought to bear upon it.

Into the rear side $a$ of the frame are inserted one or more set-screws, S, all arranged near the fulcrum of lever F, upon which latter (the lever) their pressure may be brought to bear. Thus, when the lever has become loose from wear, or when, through wear or repeated sharpenings, the shear-blades do not work well and close together, they may be adjusted to a good working position by forcing lever F, by set-screws S, forward in the direction of plate $b$, which holds the stationary shear-blade to any desired extent.

From the foregoing description, and by reference to the drawings hereto annexed, the operation of our invention and its advantages will be readily understood. To shrink or upset a tire, the slide L is first, by raising lever H, brought as far away from bracket $l$ as it will go. The tire is then secured in position by the toothed eccentric-levers, and finally the slide L is brought toward bracket $l$ by exerting a downward pressure upon lever H, thus upsetting the tire. By similarly operating lever H the shears are operated.

The principal advantages of our machine are its simplicity, compactness, and the durability resulting therefrom. Owing to the friction-roller $h$ between the wings $g\ g$ of cam G, the lever F is operated very easily and smoothly; and the arrangement of the set-screws S, as described, enables wear upon the shears to be compensated for with little trouble, thus enabling the machine to be kept always in good working order. Finally, the flange $k$ and the body of slide L exclude all dirt and scales from the working parts of the machine.

Having thus described our invention, we claim and desire to secure by Letters Patent of the United States—

1. The side pieces $a\ b$, shaft C, having its bearings therein, bent lever F, having forked arm $f$, shaft D, having cam G, provided with friction-roller $h$, and lever H, all combined and operating substantially in the manner and for the purpose herein shown and specified.

2. The bent lever F, having forked arm $f$, carrying the shear-blade I, operating-cam G, having friction-roller $h$, and slotted frame A, having detachable covering-plate $b$, provided with solid shear-blade J, all arranged and operating substantially as described, for the purpose set forth.

3. The combination of sliding plate L, having guide-stud $n$ and recess N, side plates $a\ b$, having grooves $n'$ on their inner sides to fit the stud $n$, lever F, having arms $e\ f$, cam G, having friction-roller $h$, and shaft D, substantially as described, and for the purpose specified.

4. The improved tire upsetting and shearing machine herein described, consisting, essentially, of the slotted frame A, shafts C D, cam G, having friction-roller $h$, bent lever F, having forked arm $f$, carrying shear-blade I, slide L, having bracket $k'$ and eccentric-lever M, operated by short arm $e$ of lever F, detachable covering-plate $b$, having shear J, set-screw S, and bracket $l$, carrying eccentric-lever K, all arranged and operating substantially in the manner and for the purposes herein shown and specified.

In testimony that we claim the foregoing as our own we have hereto affixed our signatures in presence of two witnesses.

ISAAC N. PENNOCK.
WILLARD PENNOCK.

Witnesses:
G. G. J. GREENWOOD,
JOHN BRIEDENSTEIN.